July 15, 1947.     C. L. BOOKER     2,424,015
PIE CUTTER
Filed Aug. 1, 1944

INVENTOR.
CARTER L. BOOKER
BY
ATTORNEYS

Patented July 15, 1947

2,424,015

UNITED STATES PATENT OFFICE 2,424,015

PIE CUTTER

Carter L. Booker, St. Helena, Calif.

Application August 1, 1944, Serial No. 547,563

4 Claims. (Cl. 30—302)

This invention relates to pie cutters adapted to segment the finished pie in its baking pan or dish.

It is the object of this invention to provide a cutter which in a single operation will cut the baked pie into the desired number of segments and thus speed up the preparation and serving in material degree.

It is the further object of the invention to provide a pie cutter which will produce a degree of uniformity in the shape of the cuts which cannot be attained where such cuts are individually made. It is a further object of the invention to provide a cutting means which will segment the pie without damaging or marring the appearance of the resulting cut.

Another object of the invention is to provide a cutter which, though capable of accomplishing the above stated objects, may be manufactured at a reasonable cost, which has few parts, which will be positive in its operation, and which may be readily cleaned between operations.

Other objects of the invention will become more apparent as this specification proceeds, and the novelty of the device will be pointed out in the appended claims with the requisite degree of particularity.

Figure 1:
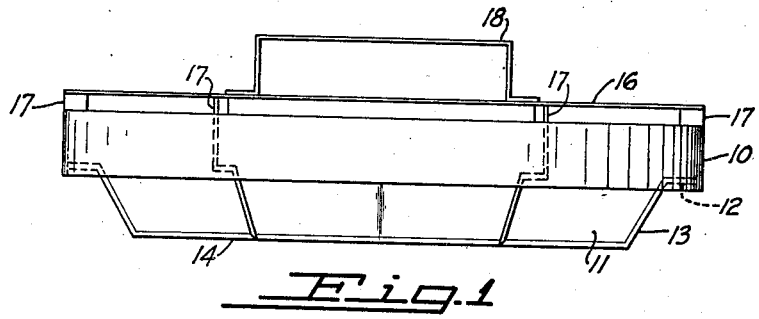
Figure 2:
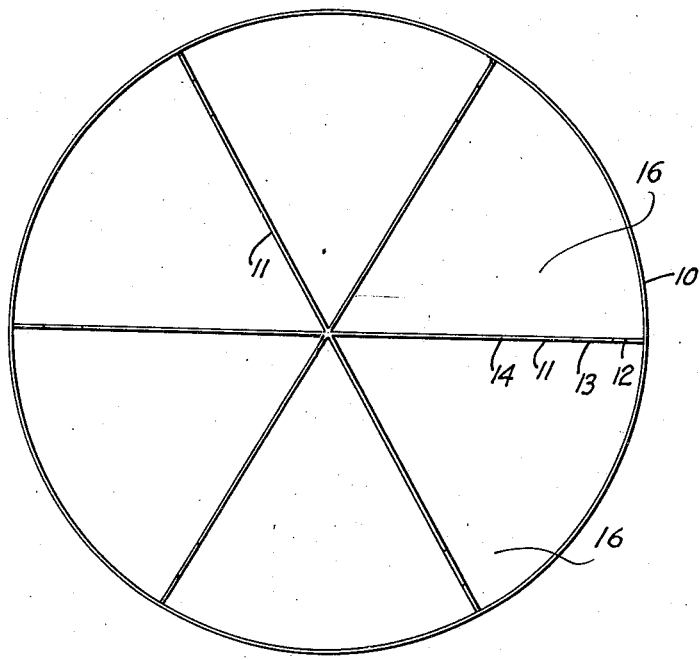
Figure 3:
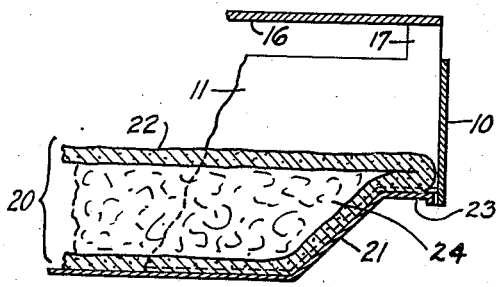

In the drawings forming a part hereof, wherein a preferred form of the invention is illustrated for purposes of this disclosure, Figure 1 is a side elevation of a pie cutter embodying the principles of the invention, Figure 2 is a bottom plan view of the device of Figure 1, and Figure 3 is an enlarged detailed view showing the end portion of one of the cutter blades in operation.

In the preferred form shown in the drawings the numeral 10 designates a centering ring, of slightly greater diameter than the conventional pie baking pan, within which are contained a plurality of fixed cutter blades 11. The blades 11 are arranged radially from a common axis and their outer ends are joined to the inner wall of the ring 10, in any manner desired, as by welding. While six such blades are shown it will be understood that the number selected will be determined by the number of segments desired from the pie according to commercial practice.

The bottom or cutting edges of the blades 11 are shaped to conform to the contour of the conventional pie pan, and hence have a shoulder 12 to bear against the rim of the pan, an inwardly inclined edge 13 to bear against the sloped wall of the pan, and a flat portion 14 to bear against the bottom of the pie pan. The thus shaped bottom edges of the blades 11 are ground in the usual way.

A backing plate 16 is secured to the upper edges of blades 11, in spaced relation to the ring 10, by means of the lugs 17 carried by the said blades. Plate 16 carries a centrally disposed handle 18, as a matter of convenient handling.

The operation of the device may be best understood by reference to Figure 3 of the drawings wherein a pie 20 is shown in a pan 21, both being illustrated in cross-section. The crust 22 is shown as extending onto the rim 23 of the pan and the blade 11 is shown as having penetrated through the upper crust, filler 24 and the bottom crust to completely sever a pie segment. Ring 10 overhangs the peripheral edge of pan 21 to center the cutter with respect to the pie 20. It will be understood, of course, that it is necessary only to lower the cutter onto the top crust or surface of the pie and apply minimum pressure to effect the cutting of the pie pieces.

It will also be observed that by spacing the backing plate 16 from the centering ring 10 and blades 11 opportunity is afforded for the escape of air which, if compressed, would be sufficient to mar the appearance of the pie pieces.

While the device illustrated herein is made of sheet metal, it will be appreciated that it may be manufactured wholly or in part from lighter and cheaper materials, such as plastic compositions.

Practical experience indicates that a device constructed according to the principles of the herein disclosed invention materially reduces the chore of preparing the pie pieces for serving as compared to the commonly accepted practice of cutting the individual pieces with a hand knife. Moreover, it has been observed that the device is efficient in cutting all kinds of pies, including even the fragile meringues. Finally, the device is free of moving parts and because of this, and its skeleton-like construction, it may be readily cleaned between operations by simple immersion or rinsing.

While a single embodiment of the invention has been disclosed herein for purposes of illustration, full protection is desired in accordance with the scope of the appended claims.

The invention claimed is:

1. A pie cutter comprising a ring, a plurality of radially arranged cutting blades carried by the ring, a backing plate, connector means for the backing plate and the ring holding the former in spaced relation to the upper edge of the latter, and a handle carried by the backing plate.

2. A pie cutter comprising a centering ring, a plurality of cutter blades carried within the ring and extending radially from a common axis, a backing plate connector means for the backing plate and the ring holding the former in spaced relation to the upper edge of the latter, and a handle carried by the backing plate.

3. A pie cutter comprising a centering ring, a plurality of cutter blades carried within the ring and extending radially from a common axis, the bottom edge of each of said blades conforming in shape to the contour of a conventional pie pan in having a shoulder portion to engage the pan rim, an inwardly inclined portion to engage the sloping pan wall and a flat portion to engage the pan bottom, the shoulder portion of the cutting edge being disposed above the bottom edge of the centering ring, a backing plate, spacer members connecting the backing plate and the centering ring, and a handle carried by the backing plate.

4. A pie cutter adapted for use in conjunction with a conventional pie pan wherein the cross-sectional contour includes a peripheral rim, a sloping wall and a flat bottom, comprising, a centering ring of greater diameter than the pie pan, a plurality of cutter blades carried within the ring and extending radially from a common axis, the bottom edge of each of said blades conforming in shape to the cross-sectional contour of the pan, and handle means for the combination thus formed.

CARTER L. BOOKER.

REFERENCES CITED

The following references are of record in the file of this patent:

UNITED STATES PATENTS

| Number | Name | Date |
| --- | --- | --- |
| 1,581,310 | Fetschan | Apr. 20, 1926 |
| 2,003,253 | Deutsch | May 28, 1935 |